(12) United States Patent
McGlasson et al.

(10) Patent No.: US 6,481,508 B2
(45) Date of Patent: Nov. 19, 2002

(54) SPINDLE FOR MACHINE TOOL

(75) Inventors: William D. McGlasson, Caledonia, NY (US); David A. Wright, Victor, NY (US); Michael W. Roberts, Churchville, NY (US); Anthony J. Norselli, Rochester, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/730,216

(22) Filed: Dec. 5, 2000

(65) Prior Publication Data

US 2001/0030050 A1 Oct. 18, 2001

Related U.S. Application Data

(60) Provisional application No. 60/172,461, filed on Dec. 17, 1999.

(51) Int. Cl.[7] .......................... B24B 21/16; G01M 13/02
(52) U.S. Cl. ..................... 173/211; 173/213; 173/216; 73/162; 451/47
(58) Field of Search .................................. 173/210, 211, 173/216, 213; 451/5, 114, 47; 73/162

(56) References Cited

U.S. PATENT DOCUMENTS

| | | |
|---|---|---|
| 3,099,901 A | 8/1963 | Hunkeler |
| 3,142,940 A | 8/1964 | Rebeski |
| 3,717,958 A | 2/1973 | Ellwanger et al. |
| 3,807,094 A | 4/1974 | Ellwanger et al. |
| 4,788,476 A | 11/1988 | Ginier |
| 5,609,058 A | 3/1997 | Gnadt et al. |
| 6,120,355 A | 9/2000 | Stadtfeld et al. |

FOREIGN PATENT DOCUMENTS

| | | |
|---|---|---|
| EP | 0061086 | 9/1982 |

*Primary Examiner*—Scott A. Smith
(74) *Attorney, Agent, or Firm*—Robert L. McDowell

(57) ABSTRACT

A spindle (60) for a machine tool comprising a rear spindle portion (62) and a forward spindle portion (64) with each of the rear spindle portion and the forward spindle portion being rotatable about the same axis relative to one another. The inventive spindle includes one or more spring elements (68) extending between the rear spindle portion and the forward spindle portion whereby with the forward spindle portion and the rear spindle portion rotating at a predetermined amount and with the rotation of the forward spindle portion being constrained at that amount, an additional rotation applied to the rear spindle portion results in a deflection of the springs thereby effecting a torque between the forward and the rear spindle portions. The present invention also includes a control method which has as its objective to control the position of, not the torque applied to, one of the spindles, usually the gear member spindle. In this method, the gear member spindle position is controlled relative to the pinion member spindle position by a computer numerical control (CNC). As the pinion member is turned at some speed, the gear member is kept in coordination with the pinion (according to their ratio) by the CNC control. The gear member spindle can be commanded to include additional rotational components which, in effect, advance or retard the gear rotation relative to the pinion.

11 Claims, 4 Drawing Sheets

SPINDLE FOR MACHINE TOOL

This application claims the benefit of U.S. Provisional Application No. 60/172,461 filed Dec. 17, 1999.

FIELD OF THE INVENTION

The present invention is directed to machine tools and in particular to spindles for machine tools such as those for lapping or testing of gears.

BACKGROUND OF THE INVENTION

Lapping is a well established process for finishing the tooth surfaces of bevel gears. It is a process that provides an economical alternative to other hard finishing processes for bevel gears and it has been used in all areas except for some aircraft applications.

In the lapping process, a pinion and ring gear are mounted, via appropriate workholding equipment, to respective spindles in a lapping machine, which has the same basic design as a testing machine. In most instances of rolling of the gearset, the pinion is the driving member and the ring gear is braked. The gears are rolled in mesh and lapping compound, which can be a mixture of oil (or water) and silicon carbide or similar, abrasive, is poured into the meshing zone. Examples of lapping and/or testing machines can be found in U.S. Pat. No. 3,099,901 to Hunkeler; U.S. Pat. No. 3,142,940 to Rebeski; U.S. Pat. Nos. 3,717,958 and 3,807,094 to Ellwanger et al.; U.S. Pat. No. 5,609,058 to Gnadt et al., and U.S. Pat. No. 6,120,355 to Stadtfeld et al.

Most lapping and testing machines have three degrees of freedom available for realizing relative motion between a ring gear and pinion. The first freedom being relative movement in the direction of the ring gear axis which shall be referred to as direction G or the G axis, the second freedom being relative movement in direction of the pinion axis which shall be referred to as direction H or the H axis, and the third degree of freedom being distance between the ring gear and pinion axes which shall be referred to as direction V or the V axis. The direction V is also known as the "hypoid offset."

In lapping or testing processes, relative movement in the V and H directions effect positional changes in the contact pattern of the members of the gearset, in effect modifying the contact pattern. Lapping involves rotating the gear members in mesh and under a load with contact at a desired position on the tooth surfaces. Thus, the members are located at particular V and H positions along with a particular G axis position to effect the desired backlash. As the gear set is lapped, contact is shifted toward one of the outer (heel) or inner (toe) portions of the tooth surface by changing the V and H settings as necessary to effect such a shifting of the contact position. As V and H are changed to effect the shifting, the G axis position must also be changed to maintain the desired backlash.

Lapping operations may be carried out at pinion spindle speeds ranging from about 1000 RPM to about 4000 RPM. At the higher speeds (for example 2500–4000 RPM), imperfections in spindle construction, drive train construction, gear set motion transmission error, or running conditions, although slight, can be magnified to produce undesirable periodic changes in driving moments which can build to amplitude levels such that the tooth bearing patterns in the finished product become difficult to control by the lapping process.

One solution to the above problem is addressed in U.S. Pat. No. 3,807,094 to Ellwanger et al. wherein a lapping machine comprises an elastomeric coupling mounted between a pair of mounting blocks on the spindle associated with a braking means (usually the driven spindle to which a gear member is mounted). The elastomeric coupling twists, thus allowing one mounting block to rotate relative to the other mounting block, to isolate and absorb any aberrations in rotational moments due to braking of the spindle or other imperfections as discussed above.

The elastomeric coupling discussed above exhibits a fixed combination of damping and spring characteristics which are not necessarily well matched to the spindle and gear inertia. Therefore, where undesirable effects are best isolated and absorbed by controlling the total system dynamics in terms of inertia, damping and spring rate, an elastomeric coupling may provide little relief of the problem.

It is known for machines to employ a mechanical brake on the gear spindle, or electronic torque control on the gear spindle motor, to control the load applied between the teeth of the gearset during testing or lapping. However, these methods have not led to good control of the dynamic load variations occurring as a function of gear or pinion rotation and tooth-to-tooth rolling transitions.

It is an object of the present invention to provide an improved machine tool spindle exhibiting optimized dynamic properties comprised of spring, damping and inertial elements. It is also an object of the present invention to provide an electronic control scheme to apply to the inventive spindle as a further means. of controlling the dynamic force between the gear set members.

These and other objects and advantages of the present invention will appear more clearly from the following description and the accompanying drawings.

SUMMARY OF THE INVENTION

The present invention is directed to a spindle for a machine tool comprising a rear spindle portion and a forward spindle portion with each of the rear spindle portion and the forward spindle portion being rotatable relative to one another about the same axis. The inventive spindle includes one or more spring elements extending between the rear spindle portion and the forward spindle portion whereby with the forward spindle portion and the rear spindle portion rotating at a predetermined amount and with the rotation of the forward spindle portion being constrained at that amount, an additional rotation applied to the rear spindle portion results in a deflection of the springs thereby effecting a torque between the forward and the rear spindle portions.

The present invention also includes a control method which has as its objective to control the position of, not the torque applied to, one of the spindles, usually the gear member spindle. In this method, the gear member spindle position is controlled relative to the pinion member spindle position by means such as computer numerical control (CNC). As the pinion member is turned at some speed, the gear member is kept in coordination with the pinion (according to their ratio) by the CNC control. The gear member spindle can be commanded to include additional rotational components which, in effect, advance or retard the gear rotation relative to the pinion.

DETAILED DESCRIPTION OF THE PREFERRED EMBODIMENT

The details of the present invention will now be discussed with reference to the accompanying drawings.

Figure 1:
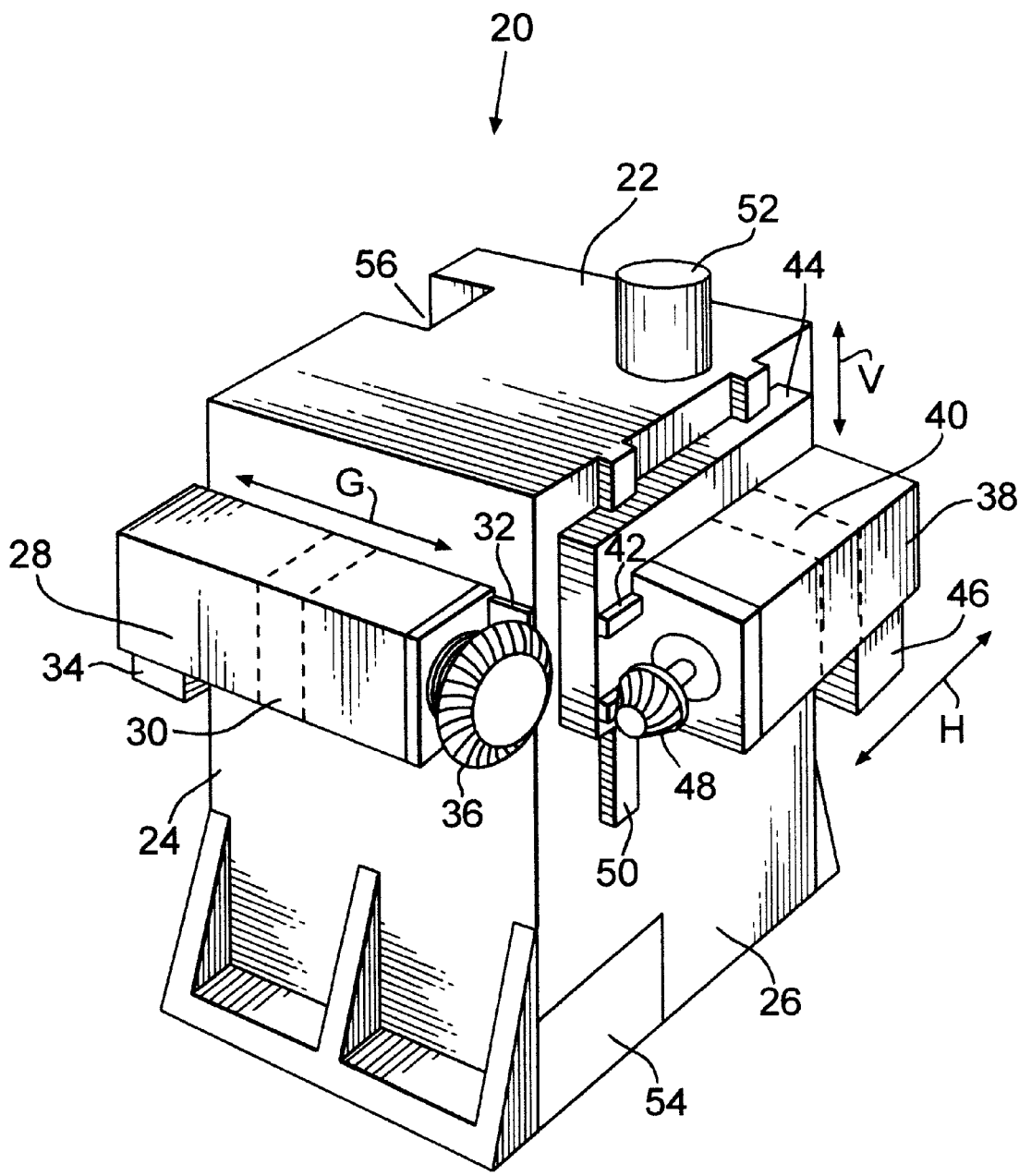
FIG. 1 schematically illustrates a known lapping machine.

FIG. 1 illustrates a lapping machine designated generally by 20. Such a lapping machine being of the type as disclosed in previously mentioned U.S. Pat. No. 6,120,355. For ease in viewing the various machine components, FIG. 1 illustrates the machine 20 without doors and exterior sheet metal. The machine 20 comprises a single column 22 that may also be thought of as the machine frame or base. Column 22 comprises at least three sides, preferably four sides, with at least two of the sides, first side 24 and second side 26, being perpendicular to one another. Each of the first and second sides comprises a width and a height (as viewed in FIG. 1).

Figure 2:
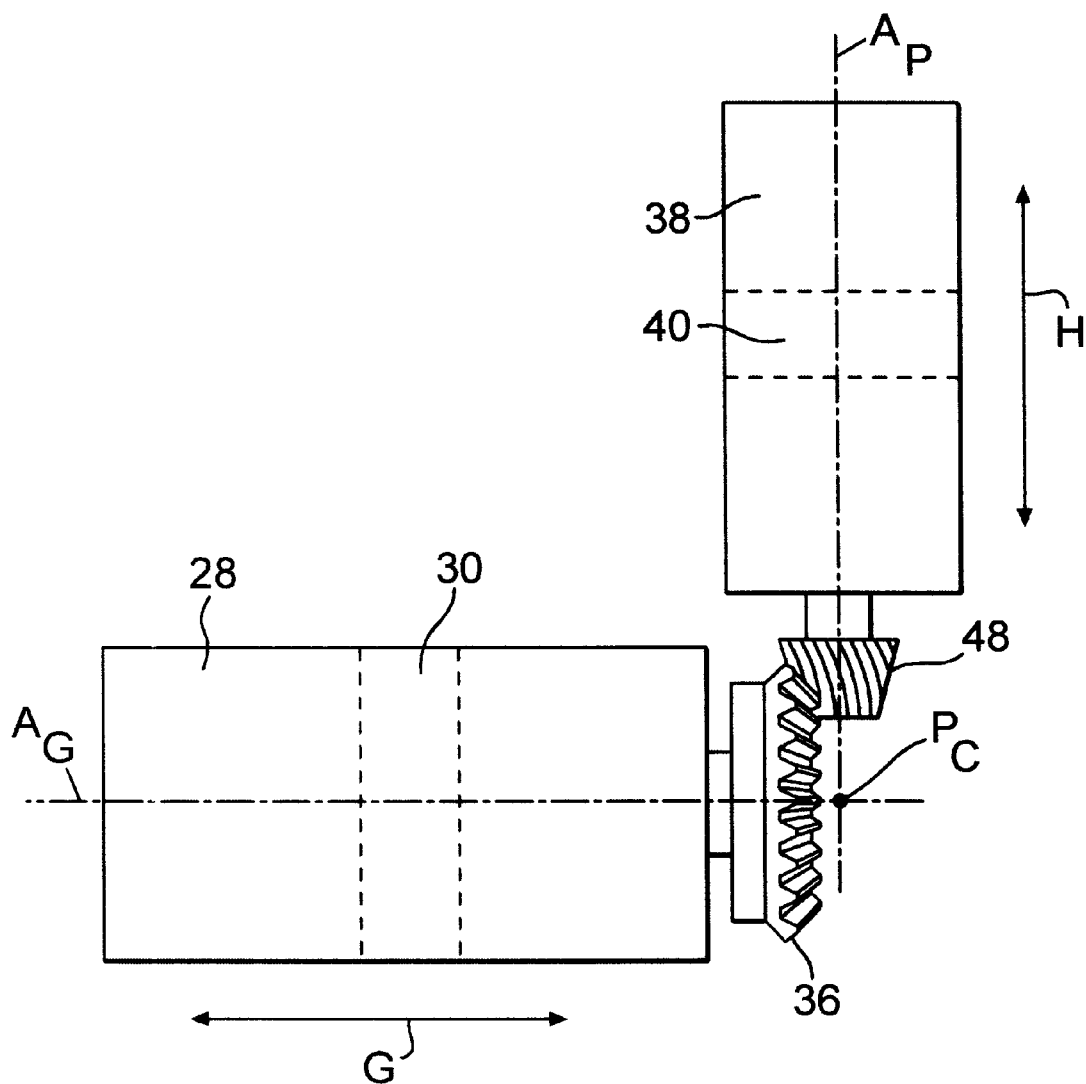
FIG. 2 shows a top view of the spindle arrangement of the machine of FIG. 1.

First side 24 includes first workpiece spindle 28 which is rotatable about axis $A_G$ (FIG. 2) and is preferably driven by a direct drive motor 30 mounted between front and rear spindle bearings (not shown). Spindle 28 is movable along the width of first side 24 in direction G on ways 32 attached directly to column 22. Movement of spindle 28 in direction G is provided by motor 34 through a direct-coupled ballscrew (not shown). Preferably, a bevel ring gear member 36 is releasably mounted to spindle 28 by suitable workholding equipment as is known in the art.

Second side 26 includes second workpiece spindle 38 which is rotatable about axis Ap (FIG. 2) and is preferably driven by a direct drive motor 40 mounted between front and rear spindle bearings (not shown) with motor 40 capable of attaining a pinion rotation of about 4000 RPM. The RPM of motor 30 would be: pinion RPM/ratio of the gearset. The ratio of the gearset is defined as: number of teeth on gear member/number of teeth on pinion member.

Spindle 38 is movable along the width of second side 26 in direction H on ways 42 attached to slide 44. Movement of spindle 38 in direction H is provided by motor 46 through a direct-coupled ballscrew. Preferably, a pinion member 48 is releasably mounted to spindle 38 by suitable workholding equipment as is known in the art. Workpiece spindle 38 is also movable along the height of second side 26 in direction V since slide 44 is movable in the V direction via ways 50 with movement being provided by motor 52 through a direct-coupled ballscrew. Directions G, H and V are mutually perpendicular with respect to one another. For practical purposes as well as for purposes of illustration, in FIG. 1, the V direction is vertical Movement of first work spindle 28 in direction G, second work spindle 38 in direction H, slide 44 in direction V, as well as first spindle rotation and second spindle rotation, is imparted by the separate drive motors 34, 46, 52, 30 and 40 respectively. The above-named components are capable of independent movement with respect to one another or may move simultaneously with one another. Each of the respective motors is associated with a feedback device such as a linear or rotary encoder (not shown) as part of a CNC system which governs the operation of the drive motors in accordance with instructions input to a computer controller such as the Fanuc model 160i.

A tank for holding lapping compound is placed generally under the work chamber area adjacent to second side 26 as outlined by 54. In this manner, the tank can remain within the exterior sheet metal housing thus keeping the machine footprint size at a minimum. Also, a cutout area 56 of the column 22 may be included at an area of the column remote from the spindles for placement of any necessary electrical transformers. With this arrangement, such electrical components can also stay within the exterior sheet metal enclosure and yet be spaced far enough from the spindles such that heat radiating from the electrical components will not adversely influence the accuracy of the spindles or other tolerance sensitive elements.

With direct drive spindles 28 and 38, and with the elimination of a remote drive motor, belt and pulleys, the dynamics of the drive system are also greatly reduced and simplified.

However, even with direct drive spindles, the tooth-to-tooth dynamic forces produced while rolling a gearset together are highly influenced by the inertia, spring rate, and damping characteristics of the two spindles. These three characteristics, along with friction and other incidental effects, combine to produce the overall dynamic response of a spindle.

One objective of lapping or testing is to control the force (torque) between the rotating members. To control force, compliance is often beneficial. Compliance, the inverse of stiffness, defines the relationship between position and force. For example, in a very compliant system, position can change greatly with little effect on force, whereas in a very non-compliant system, a small change in position can lead to a large change in force.

The present invention employs compliance as a means of controlling force. Preferably, compliance is implemented in a rotary sense on one or both spindles. Most preferably, compliance is implemented on the gear spindle (for example, 28 in FIGS. 1 or 2).

Figure 3:
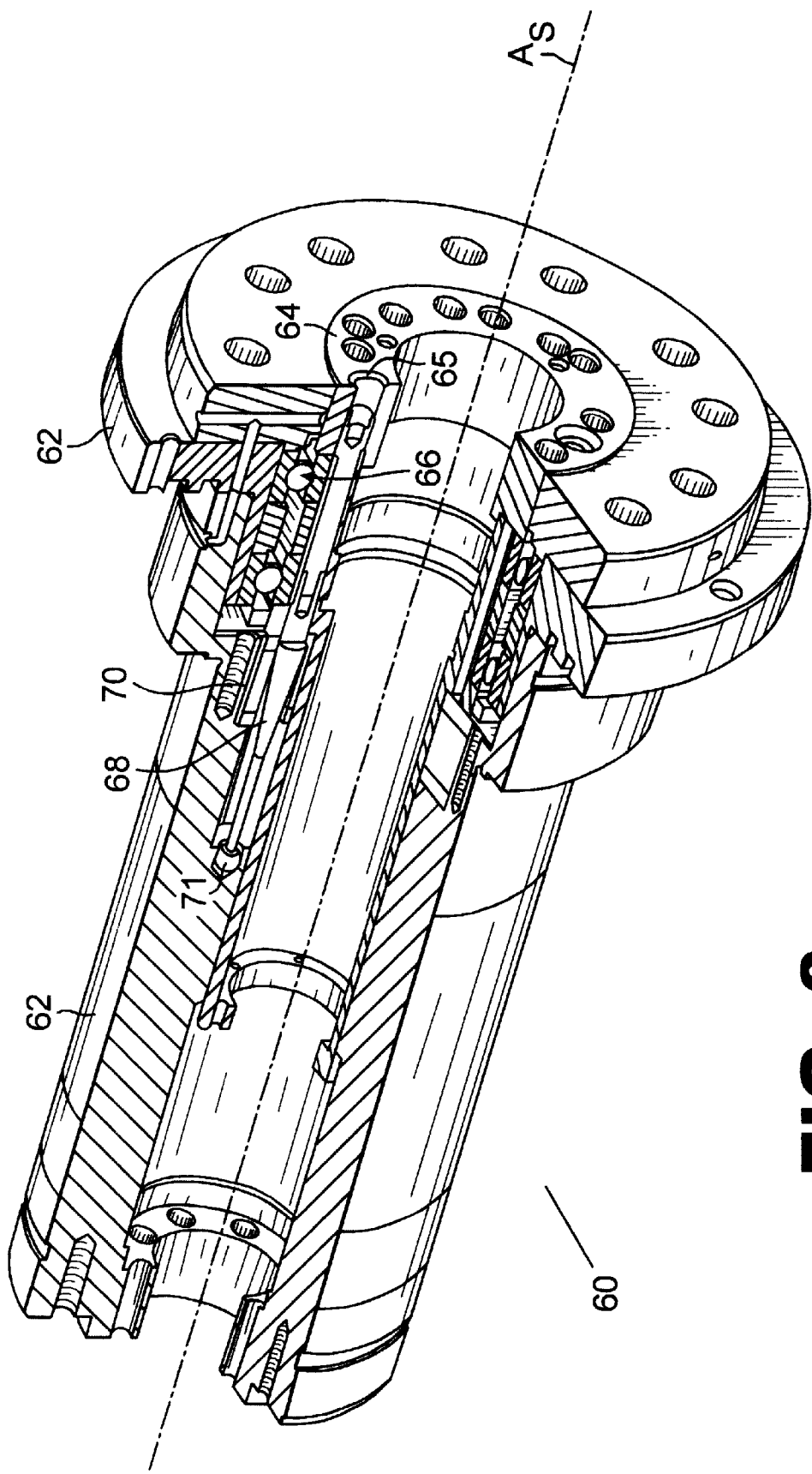
FIG. 3 illustrates an axial cross-sectional view of a spindle in accordance with the present invention.

FIG. 3 illustrates a spindle 60 in accordance with the present invention. The spindle 60 comprises two sections, a rear spindle 62 and a forward spindle 64, each rotatable about the same axis $A_s$. It is to be understood that the terms "rear" and "front" are relative terms selected to describe the relative positional relationship of the components of spindle 60 and are not indicative of any particular orientation of the spindle 60. The spindle 60 may be oriented in any position and is not limited to the generally horizontal orientation illustrated by FIG. 3.

The rear spindle 62 incorporates a direct drive motor (not shown) and a gear to be lapped is chucked into workholding equipment (not shown) that is bolted to the forward spindle 64. The forward spindle 64 rotates on bearings 66 relative to the rear spindle 62. Rear spindle 62 and forward spindle 64 are connected by one or more spring elements 68 (only one is shown) with three being preferred. Optionally, a damping element 70 may be positioned between rear spindle 62 and forward spindle 64. With rear spindle 62 held stationary, forward spindle 64, along with a workpiece, would be rotationally free (within the physical bounds of the spring elements) and if rotated relative to the rear spindle 62, would be subject to the physical forces of the spring element 68 and of any damping elements 70 installed into the spindle 60. The spring element 68 provides a force that opposes and is a function of the rotary displacement.

Figure 4:
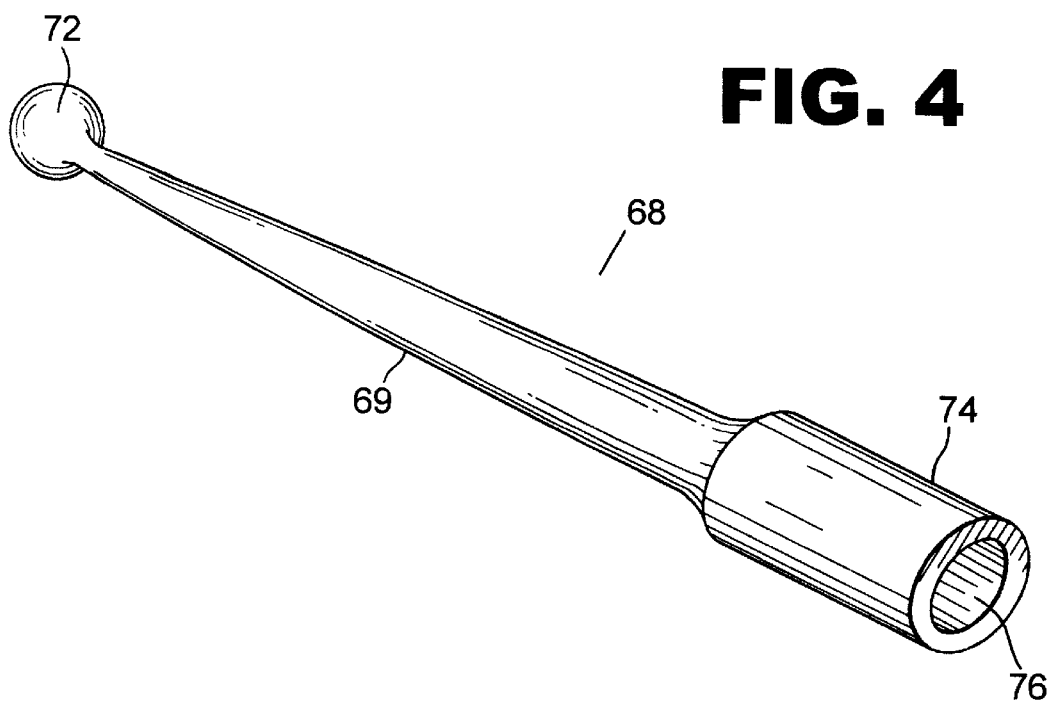
FIG. 4 illustrates an enlarged view of a spring element of the present invention.
Figure 5:
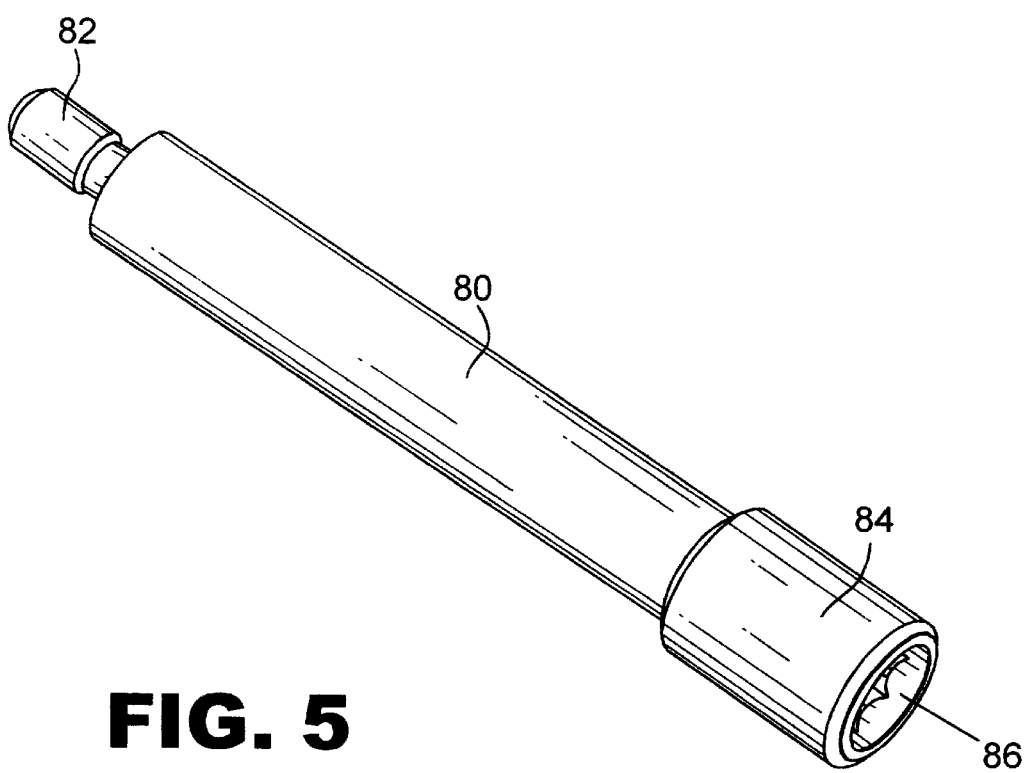
FIG. 5 illustrates an enlarged view of a positioning screw for axially positioning the spring element of FIG. 4 in a spindle.

FIGS. 4 and 5 provide an enlarged view of, respectively, spring element 68 and positioning screw 80. Spring element 68 is a cantilevered-type element and includes a first end 72, which is positionable in rear spindle 62, a beam portion 69, and a generally cylindrical-shaped second end 74 having an opening 76, preferably threaded, for the attachment of positioning screw 80. First end or tip 72, although shown in the preferred form of a sphere, may be any suitable shape for inserting into the rear spindle 62. Rear spindle 62 includes a bore 71 for receiving spherical first end 72.

Positioning screw 80 includes a first end 82, preferably threaded, for attachment to the spring element 68 by threaded insertion into opening 76. Positioning screw 80 also includes a second end 84 having exterior threads and a drive socket 86. Once spring element 68 and positioning screw 80 are secured together, the assembly is inserted through a threaded opening 65 (FIG. 3) in the front of forward spindle 64. The assembly is advanced, by the action of a wrench in drive socket 86, to position the first end 72 in the rear spindle 62 thus axially fixing the spring element 68 in position to resist relative rotational motion between the rear spindle 62 and the forward spindle 64. Alternatively, spring element 68 and positioning screw-80 may be formed as a single unit.

Thus, the second end 74 of spring element 68 is fixed (via positioning screw 80) as a cantilever to the forward spindle 64. Spherical tip 72 is preferably machined into the spring 68 itself as a single piece. The spherical shape of the tip 72 fits closely into the bore 71 in the rear spindle 62. During spring deflection, only spherical portions of the tip 72 contact the bore 71 as the angle and axial distance of the spring tip in the bore 71 changes. This accomplishes a simple beam loading with little friction and backlash. The circular cross section beam 69 allows the spring element 68 to function identically regardless of its rotational position resulting from threading through opening 65.

The cross-sectional diameter of the beam 69 varies along its length to allow maximum total spring deflection and produce uniform bending stresses along its length as is known in the art of spring design. Different spring rates can be accomplished by making beams of various lengths and/or cross-sections. The deflection of the springs is mechanically limited by stop means on the spindles, such stop means preferably being in the form of a mechanical hard stop for preventing the deflection of a spring element from exceeding its fatigue limit.

The inertia of all parts turning with the forward spindle 64 provides a force that opposes and is linear with the acceleration imposed on the forward spindle. The dynamics of the forward spindle 64 relative to the rear spindle 62 then become primarily a function of the forward spindle inertia (forward spindle 64, the workholding equipment, and the workpiece, i.e. a gear), the spring element and the damping element. Values for the spring and damping elements that are appropriate to the inertia must be selected to control the dynamic response of the gear.

The rear spindle 62 incorporates a direct drive motor (not shown) which is servo controlled. The dynamics of the rear spindle 62 are controlled by a servo-controlled algorithm input into the machine controller for providing appropriate electronic damping and stiffness.

The pinion spindle (driver spindle) also preferably incorporates a servo-controlled direct-drive motor. The pinion is chucked into workholding equipment that is bolted to the spindle. All these elements turn together as one. A servo controlled algorithm is employed to provide appropriate electronic damping and stiffness.

Compared to lapping or testing machines of the prior art, the inventive spindle 60 (usually the gear spindle) does not utilize the spindle motor in a torque control mode and does not employ any mechanical brake to produce loading. Instead, the rotation of the rear spindle 62 is locked in a timed relationship with the rotation of the pinion spindle according to the ratio of the number of teeth on the parts to be run in the machine. Thus, the objective of the servo control of the rear spindle 62 is to control the position of, not the torque applied to, the rear spindle 62.

An advantage of employing physical spring elements rather than electronic motor torque control is that the laws of physics that govern these simple devices apply without digital quantization noise or computer numerical control (CNC) frequency limitations. The motion transmission errors associated with any real gearset lead to small dynamic changes to the spring element deflection and, if utilized, damper deflection. Since these deflections are absorbed by the spring element, and any other compliant element such as a damper, as compared to incompliant spindles, the motion transmission errors produce a much smaller effect on the servo control process.

In addition, the physical dynamic behavior of these mechanical elements can be beneficially used in the lapping process. By allowing the gearset motion transmission error to dynamically deflect the spring, the torque does not remain exactly constant at the nominal value but, in the case of the spring, increases with greater deflection and decreases with reduced deflection. This effect can be used to improve the gearset motion transmission error (for example, gear run-out and pinion run-out) by lapping high spots with greater force than the low spots.

Appropriate selection of the spring, damper and inertia of the forward. spindle can deliver the desired response to motion-transmission error. From the perspective of the pinion delivering motion-transmission errors to the gear, the gear can react primarily like an inertia, primarily like a spring, primarily like a damper, or a combination of any or all of the above, according to the well known dynamic analysis of a second-order system. The type of reaction, moreover, is a function of the frequency content of the motion-transmission error.

In such a second-order system, if the excitation frequency (the imposed motion transmission error) is sufficiently high, then the forward spindle and gear will act like an inertia. If the frequency is sufficiently low, it will behave like a spring. How, and over what frequencies, it transitions from the low-frequency spring-like behavior to the high-frequency inertia-like behavior is governed by the selection of spring, damper and inertia values.

The inertial response to a periodic motion error should, in general, be avoided in the lapping process, since the force is 180 degrees out-of-phase with the imposed motion transmission error. The spring response is good, in general, since the force is directly in-phase with the excitation. In other words, if the response is inertial, a high spot is lapped with less force and a low spot is lapped with greater force. This means that the high spot is not removed by lapping, but can actually be made more pronounced. On the other hand, if the response is like a spring, the high spot is lapped with more force and the low spot is lapped with less force such that lapping can reduce the magnitude of the motion error.

The force variations induced by gearset motions are superposed on top of the average force level that is desired. The average force between the gear members on the machine, then, is controlled by controlling the displacement of the physical compliant elements found between the rear spindle 62 and the forward spindle 64. In addition to controlling the position of the rear spindle 62 in combination with, or as a slave to, the pinion spindle position, additional motion of the rear spindle 64 can be effected while the parts are in mesh to control the relative displacement, velocity and acceleration of the forward spindle 64 relative to the rear spindle 62. By knowing the dynamic response of the particular spring and damping elements, the displacement trajectories that produce the desired force between the gear set members can be determined.

The spring element 68 provides a force that opposes and is a function of rotary displacement. The spring element can be realized in forms other than that shown by 68 such as tension or compression helical springs between rotating members, direct torsion of cylinders or sleeves, or, direct torsion of helical springs. Alternatively, the spring elements may also be located in the workholding equipment arbor or in other additional parts of the spindle. The spring element 68 provides a linear spring rate, low friction and low hysteresis. The spindle 60 allows the spring element 68 to be changed from the front of the spindle without disassembly of the spindle. Thus, a weaker or stiffer spring element can be selected depending on the particular job to be lapped or tested.

The optional damping element 70 provides a force that opposes and is a function of the velocity of the forward spindle 64 relative to the rear spindle 62. The damping element 70 may be in the form of a hydraulic mechanism, fluid shear or elastomeric element, for example. Elastomeric elements are preferred. By changing the geometry and material, the damping rate can be changed according to process needs.

As stated above, any number of spring elements 68 may be utilized in the inventive spindle with three being preferred. Preferably, each spring element has a circular cross-section beam 69 (about 4 inches (101.60 mm) long) arranged parallel to the spindle axis and equidistantly located on a 3.75 inch (95.25 mm) diameter circular pattern such that rotation imposed on the forward spindle 64 relative to the rear spindle 62 causes each spring to deflect as a simple beam. The spring elements may be made of any suitable spring material with heat-treated chrome-vanadium alloy steel, known for spring applications, being preferred. A single spring element yields a translational spring rate of about 185 pounds per inch (lbs./in) while three such spring elements in a spindle together yield a rotational spring rate of about 25 inch-pounds per degree (in-lbs./deg).

It has previously been the objective to provide a torque between the gearset members by controlling a torque applied to one spindle, usually the gear member spindle. This applied torque could come from a mechanical brake, hydraulic motor, electronic motor control, or other means. The objective of these methods was to maintain a desired torque regardless of the position or speed imposed on the gear member spindle (through the gear mesh) by the pinion member spindle.

Although the inventive spindle can also be operated under such known torque control means as discussed above, it may also be operated under an inventive control method which has as its objective to control the position of, not the torque applied to, the gear member spindle. In this method, the gear member spindle position is controlled relative to the pinion member spindle position by means such as CNC control. An option is to operate one spindle as a slave to the other spindle such as is accomplished by an electronic gear box (EGB). Another option is to control both spindles independently but in a command-coordinated fashion.

The objective of the inventive method is to maintain the positions of the gear and pinion spindles in relation to the ratio of teeth of the mounted gearset members. As the pinion member is turned at some speed, the gear member is kept in coordination with the pinion (according to their ratio) by the CNC control. This positional relationship may be referred to as the "coordinated position." Moreover, the gear member spindle can be commanded to include additional rotational components which, in effect, advance or retard the gear rotation relative to the pinion. These additional rotational components may be referred to as the "windup commands."

As an example, three spring elements, arranged as described above, are utilized in a spindle of a lapping machine of the type previously described in U.S. Pat. No. 6,120,355 for lapping an automotive hypoid gearset comprising a pinion member having 41 teeth and a gear member having 11 teeth. The gear member is mounted to the inventive spindle. A lapping torque of 50 inch-pounds is selected. With the gear and pinion in mesh and the pinion spindle and the rear gear spindle locked into a 11×41 turning relationship (based on the 41:11 tooth ratio) by CNC servo motion control, the spindles are accelerated to a lapping speed of 3000 pinion RPM. The spring beams are not deflected and thus very little torque is applied between the gear pair members. An additional rotation of 2 degrees is then commanded to the gear rear spindle. Since the gear forward spindle cannot turn (being physically constrained by mesh with the pinion), the spring elements become deflected by the 2 degree amount leading to the desired 50 inch-pounds of gearset torque. As the V, H and G axes undergo small lapping motions, the gear member spindle is commanded additional compensatory moves to maintain the desired spring deflection.

The pinion member spindle and the gear member spindle both have rotary encoders to measure their positions. Since these encoders are not mounted directly on the gear and pinion members, then some rotational mechanical compliance exists between these encoders and their respective gearset members. One source of compliance is the gearset teeth themselves, which bend when loaded. Therefore, when windup motions are commanded with the gearset members in mesh, it is possible that those windup spindle positions are still achievable as measured by the rotary encoders, but some motor torque is required to exercise the compliance. A portion of this torque, then, is felt between the gearset members to be lapped or tested.

This compliant effect can be employed to effect the desired average gearset torque during lapping. The magnitude of the windup motions can be based on knowledge of the system compliance. The inherent compliance of the gearset teeth, the arbors, other in-line devices, and the spindles themselves can be utilized if very small windup motions are desired. Additional compliance can be designed into one or more of the spindles, as has been demonstrated by the inventive spindle, if larger wind-up motions are desired.

The benefit of controlling the position of, not the torque applied to, the spindles is that it controls the average gear force value, not the instantaneous value. In fact, the instantaneous force value can vary higher or lower as high spots and low spots of the gear tooth surfaces roll through the mesh point. This can lead to better quality from the lapping process since the high spots are lapped with greater force than the lower spots, helping to reduce them. The older torque control methods attempted to maintain the same torque regardless of high or low spots.

Any damping elements, if they are characterized by a true damping response, do not contribute to the torque as long as the amount of deflection is constant or changes slowly.

Although the present invention has been discussed and illustrated with respect to a lapping machine, the inventive spindle and control process may also be included in a testing machine for cylindrical, bevel, and hypoid gears as well as in other types of finishing machines such grinding, shaving or honing machines. In a testing machine, the tooth surfaces of one member of the pair, usually the gear member, are coated with a marking compound and then the pair is run together under a light load. Marking compound will be removed from areas of the gear tooth surface which come into contact with tooth surfaces of the mating pinion member resulting in a contact pattern or "footprint" being revealed on the tooth surfaces of the gear. The position and length of the contact pattern can then be evaluated.

The present invention also contemplates the use of springs having a non-circular cross-section. For example, flat or elliptical springs may be utilized. However, caution should be practiced when installing non-circular springs since they must be positioned in the proper orientation in order to deflect without sustaining damage.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A computer controlled machine for testing or lapping gears, said machine comprising a first spindle rotatable about a first axis and a second spindle rotatable about a second axis, said machine further comprising:

at least one of said first and second spindle including a rear spindle portion and a forward spindle portion, with each of said rear spindle portion and said forward spindle portion being rotatable relative to one another about the respective spindle axis;

one or more spring elements extending between said rear spindle portion and said forward spindle portion;

whereby the relative rotational position of said rear and forward spindle portions of at least one of said first and second spindles is controlled during machine operation to effect a predetermined deflection of said spring elements thereby resulting in a predetermined winding-up of said spring elements and the creation of a desired and controllable amount of torque between members of a meshed gearset comprising a first gearset member mounted on said first spindle and a second gearset member mounted on said second spindle.

2. The machine of claim 1 wherein said at least one said first and second spindle comprises three spring elements.

3. The machine of claim 1 wherein said at least one said first and second spindle comprises at least one dampening element.

4. The machine of claim 3 wherein at least one dampening element is located between said forward spindle portion and said rear spindle portion.

5. The machine of claim 1 said spring element comprises a circular cross section.

6. The machine of claim 1 wherein said spring element is fixed as a cantilever to one of said forward spindle portion and said rear spindle portion.

7. The machine of claim 1 wherein said spring element has a varying diameter along its length.

8. The machine of claim 1 wherein at least one of said forward spindle portion and said rear spindle portion include a stop means to limit spring element deflection whereby said spring element will not exceed its fatigue limit.

9. The machine of claim 1 wherein said rear spindle portion includes a direct drive motor.

10. The machine of claim 1 wherein said spring element comprises a first end and a second end with said first end being in the form of a sphere.

11. The machine of claim 10 wherein said sphere is insertable into and movable within a bore formed in one of said forward spindle portion and said rear spindle portion.

* * * * *